United States Patent
Sim et al.

(10) Patent No.: US 12,549,708 B2
(45) Date of Patent: Feb. 10, 2026

(54) METHOD AND APPARATUS FOR PATCH BOOK-BASED ENCODING AND DECODING OF VIDEO DATA

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Joo Hyung Byeon, Seoul (KR); Sea Nae Park, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 23 days.

(21) Appl. No.: 18/104,984

(22) Filed: Feb. 2, 2023

(65) Prior Publication Data
US 2023/0188709 A1 Jun. 15, 2023

Related U.S. Application Data

(63) Continuation of application No. PCT/KR2021/010196, filed on Aug. 4, 2021.

(30) Foreign Application Priority Data

Aug. 4, 2020 (KR) .................. 10-2020-0097613
Aug. 3, 2021 (KR) .................. 10-2021-0102129

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/186* (2014.11); *H04N 19/70* (2014.11)

(58) Field of Classification Search
CPC .. H04N 19/105; H04N 19/132; H04N 19/176; H04N 19/186; H04N 19/70; H04N 19/182; H04N 19/593; H04N 19/129
(Continued)

(56) References Cited

U.S. PATENT DOCUMENTS 10,148,977 B2 * 12/2018 Yu .................. H04N 19/176
10,277,894 B2   4/2019 Gisquet et al.
(Continued)

FOREIGN PATENT DOCUMENTS

KR   20160114570 A   10/2016
KR   101838320 B1    3/2018
(Continued)

*Primary Examiner* — Susan E. Hodges
(74) *Attorney, Agent, or Firm* — Lempia Summerfield Katz LLC

(57) ABSTRACT

Disclosed are a method and an apparatus for patch book-based encoding and decoding of video data. A video data decoding method comprises the steps of: determining a patch book list for a block of video data; and determining one or more index values for the block. Each of the index values indicates a patch book entry having color values corresponding to a subset of pixels in the block, among patch book entries of the patch book list. The decoding method further comprises a step of reconstructing subsets of the pixels on the basis of the patch book list and the index values for the block.

20 Claims, 12 Drawing Sheets

(51) Int. Cl.
*H04N 19/176* (2014.01)
*H04N 19/186* (2014.01)
*H04N 19/70* (2014.01)

(58) Field of Classification Search
USPC ........................................... 375/240
See application file for complete search history.

(56) References Cited

U.S. PATENT DOCUMENTS

| | | |
|---|---|---|
| 10,659,794 B2 | 5/2020 | Chen et al. |
| 11,558,627 B2 | 1/2023 | He et al. |
| 2013/0163661 A1 | 6/2013 | Zhang et al. |
| 2013/0163679 A1 | 6/2013 | Zhang et al. |
| 2016/0100179 A1 | 4/2016 | He et al. |
| 2016/0330455 A1 | 11/2016 | Lin et al. |
| 2017/0127058 A1* | 5/2017 | Misra ................... H04N 19/105 |
| 2018/0077411 A1* | 3/2018 | Gisquet ................ H04N 19/197 |
| 2019/0158854 A1 | 5/2019 | He et al. |
| 2020/0112745 A1* | 4/2020 | Joshi .................... H04N 13/275 |
| 2020/0153885 A1* | 5/2020 | Lee ......................... G06T 15/04 |
| 2021/0217203 A1* | 7/2021 | Kim ......................... G06T 9/001 |
| 2022/0201278 A1* | 6/2022 | Zhao ...................... H04N 19/60 |

FOREIGN PATENT DOCUMENTS

| | | |
|---|---|---|
| KR | 102088560 B1 | 3/2020 |
| KR | 20200051066 A | 5/2020 |

* cited by examiner

900

910

(a)          (b)

(a)          (b)

METHOD AND APPARATUS FOR PATCH BOOK-BASED ENCODING AND DECODING OF VIDEO DATA

CROSS-REFERENCE TO RELATED APPLICATIONS

This application is a continuation of a U.S. national stage of International Application No. PCT/KR2021/010196, filed on Aug. 4, 2021, which claims priority to Korean Patent Application No. 10-2020-0097613 filed on Aug. 4, 2020, and Korean Patent Application No. 10-2021-0102129 filed on Aug. 3, 2021, the entire disclosures of each of which are incorporated herein by reference.

TECHNICAL FIELD

The present disclosure relates to encoding and decoding of video data and, more particularly, to a method and an apparatus for patch book-based encoding and decoding of video data.

BACKGROUND

Since the volume of video data is greater than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data and decompresses and reproduces the video data.

The picture size, resolution, and frame rate are gradually increasing, and accordingly the amount of data to be encoded is also increasing. Accordingly, a new compression technique having better encoding efficiency and higher image quality than the existing compression technique is required. In particular, more efficient encoding and decoding techniques are required for screen content videos, such as animation and computer graphics.

SUMMARY

The present disclosure provides a new coding tool capable of improving encoding efficiency using texture similarity in video data.

In accordance with one aspect of the present disclosure, a method for encoding video data comprises determining a patchbook list for a block of video data; determining one or more index values for the block of video data; and encoding the index values for the block of video data. Each index value indicates a patchbook entry having color values corresponding to a subset of pixels in the block of video data among patchbook entries of the patchbook list. The patchbook is a block with a texture that frequently appears in the frame(s) of the video data.

The method further comprises generating predicted values for the subsets of pixels from patchbook entries indicated by the index values; determining residual values for the subsets of pixels from predicted values for the subsets of pixels; and encoding the residual values for the subsets of pixels. Alternatively, the subsets of pixels may be reconstructed by a video decoder based on the patchbook list and the index values, without the aid of residual values, so that the above-described steps including encoding the residual values may be omitted.

In accordance with another aspect of the present disclosure, a method for decoding video data comprises determining a patchbook list for a block of video data; and determining one or more index values for the block of video data. Each index value indicates a patchbook entry having color values corresponding to a subset of pixels in the block of video data among patchbook entries of the patchbook list. The method further comprises reconstructing the subsets of pixels based on the patchbook list for the block of video data and the index values.

The reconstructing subsets of pixels includes generating prediction values predicted values for the subsets of pixels from patchbook entries indicated by the index values, determining residual values for the subsets of pixels from a bitstream; and adding the residual values to the prediction values predicted values. Alternatively, the reconstructing subsets of pixels includes generating reconstructed sample values for the subsets of pixels from patchbook entries indicated by the index values without determining residual values for the subsets of pixels from the a bitstream.

The encoding method and the decoding method described above may be performed or implemented by a video encoding apparatus and a video decoding apparatus, respectively. Such apparatus includes a memory and one or more processors, and the one or more processors may be configured to perform the steps of the encoding method described above or the steps of the decoding method described above.

DETAILED DESCRIPTION

Figure 1:
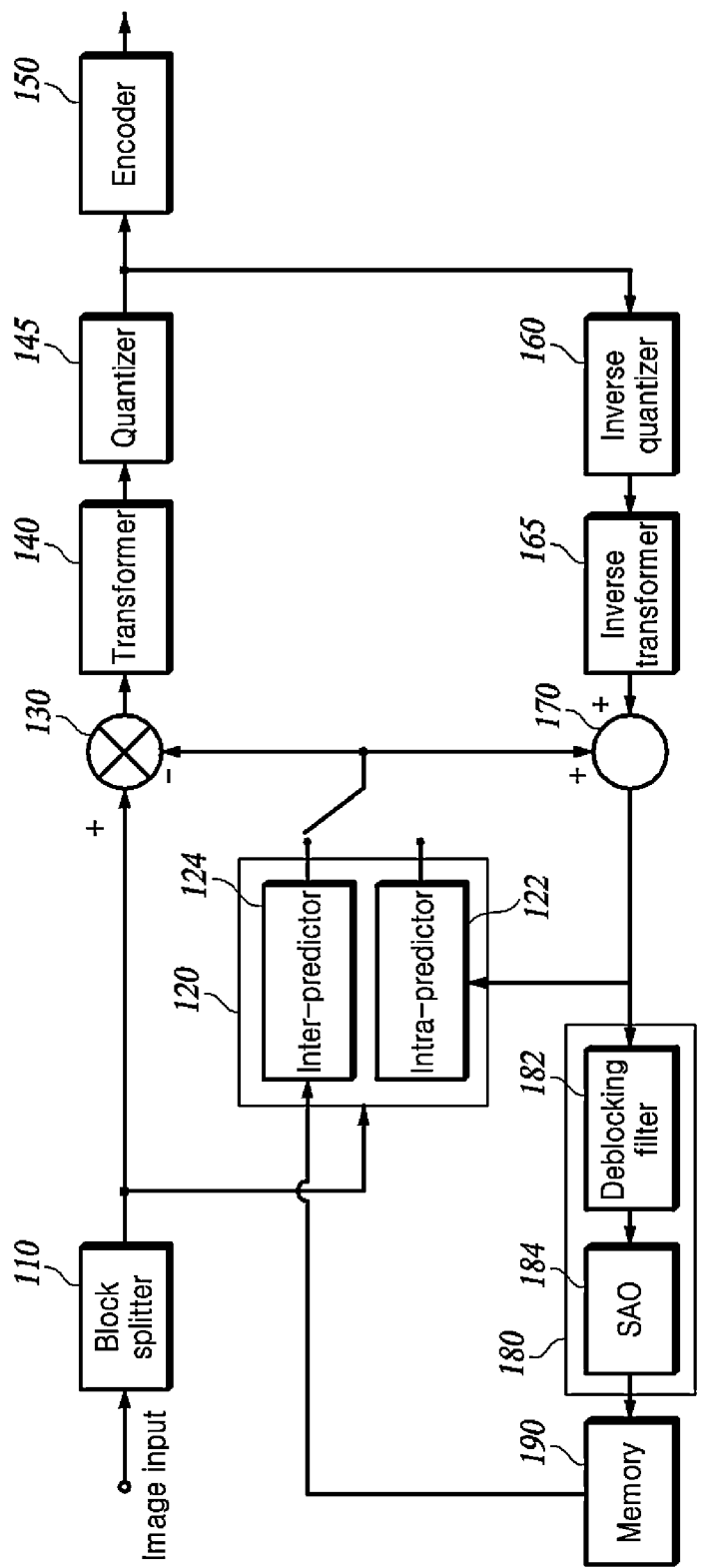
FIG. 1 is a block diagram of a video encoding apparatus that may implement the techniques of the present disclosure.

Hereinafter, some embodiments of the present disclosure are described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure.

The present disclosure discloses a patchbook prediction mode and a new coding tool capable of exploiting the long distance similarity of textures within a video frame.

In the patchbook prediction mode, a video encoder and a video decoder generate a prediction block for a coding block using a patchbook list. In the patchbook list, patchbooks, which are blocks with frequently appearing textures, are being mapped to indices. After constructing the patchbook list, the video encoder selects one or more patchbooks suitable for the current coding block from the patchbook list and signals the indices of the selected patchbooks. The decoder predicts values of pixels of the coding block using values defined in the patchbooks identified by the indices of the patchbooks parsed from a bitstream. As part of coding a coding block in the patchbook prediction mode, the video encoder and the video decoder may first determine a list of patchbooks to be used for the coding block. The patchbook indices for the coding block may then be coded to indicate which entries in the patchbook list should be used to predict or reconstruct the pixels (or samples) of the coding block.

FIG. 1 is a block diagram of a video encoding apparatus capable of implementing the techniques of the present disclosure. Hereinafter, a video encoding apparatus and elements of the apparatus are described with reference to FIG. 1.

The video encoding apparatus includes a block portioning unit 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

In particular, one video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information, which a plurality of pictures refers to in common, is encoded in a sequence parameter set (SPS). In addition, information referred to by one or more SPSs in common is encoded in a video parameter set (VPS). Information applied to one tile or tile group in common may be encoded as a syntax of a tile or tile group header.

The block portioning unit 110 is configured to determine the size of a coding tree unit (CTU). Information about the size of the CTU (CTU size) is encoded as a syntax of the SPS or PPS and is transmitted to the video decoding apparatus.

The block portioning unit 110 is configured to split each picture constituting the video into a plurality of CTUs having a predetermined size and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may also be a BinaryTree (BT), in which a node is split into two sub-nodes. The tree structure may also be a TernaryTree (TT), in which a node is split into three sub-nodes at a ratio of 1:2:1. The tree structure may also be a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. In particular, BTTT may be collectively referred to as a multiple-type tree (MTT).

Figure 2:
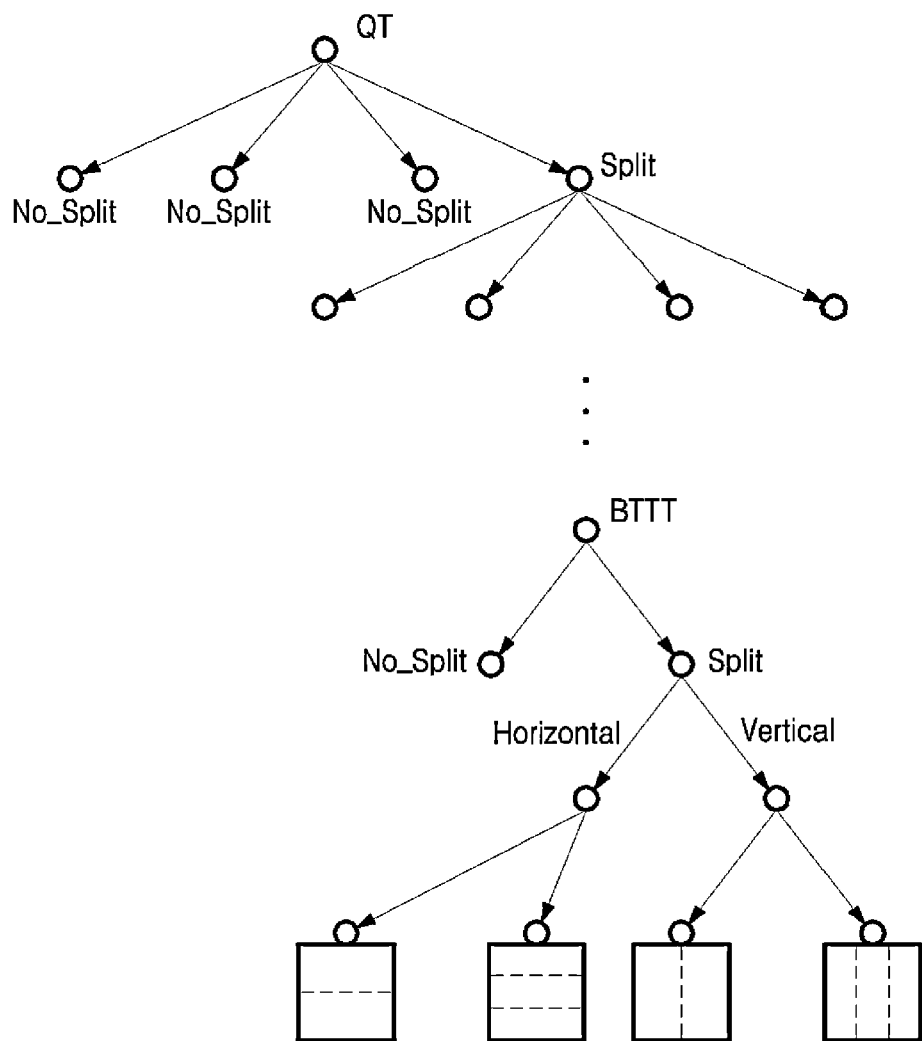
FIG. 2 illustrates a method for partitioning a block using a quadtree plus binarytree ternarytree (QTBTTT) structure.

FIG. 2 shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is less than the maximum block size (MaxBTSize) of the root node allowed in the BT, it may be further split into one or more of the BT structure or the TT structure. The BT structure and/or the TT structure may have a plurality of splitting directions. For example, there may be two directions, i.e., a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus is configured to start encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3 or may include a type of diagonally splitting a block of a node.

Particularly, CUs may have various sizes according to QTBT or QTBTTT splitting of a CTU. Hereinafter, a block corresponding to a CU (i.e., a leaf node of QTBTTT) to be encoded or decoded is referred to as a "current block". As QTBTTT splitting is employed, the shape of the current block may be square or rectangular.

The predictor 120 is configured to predict the current block to generate a prediction block. The predictor 120 includes an intra-predictor 122 and an inter-predictor 124.

In general, each of the current blocks in a picture may be predictively coded. Additionally, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
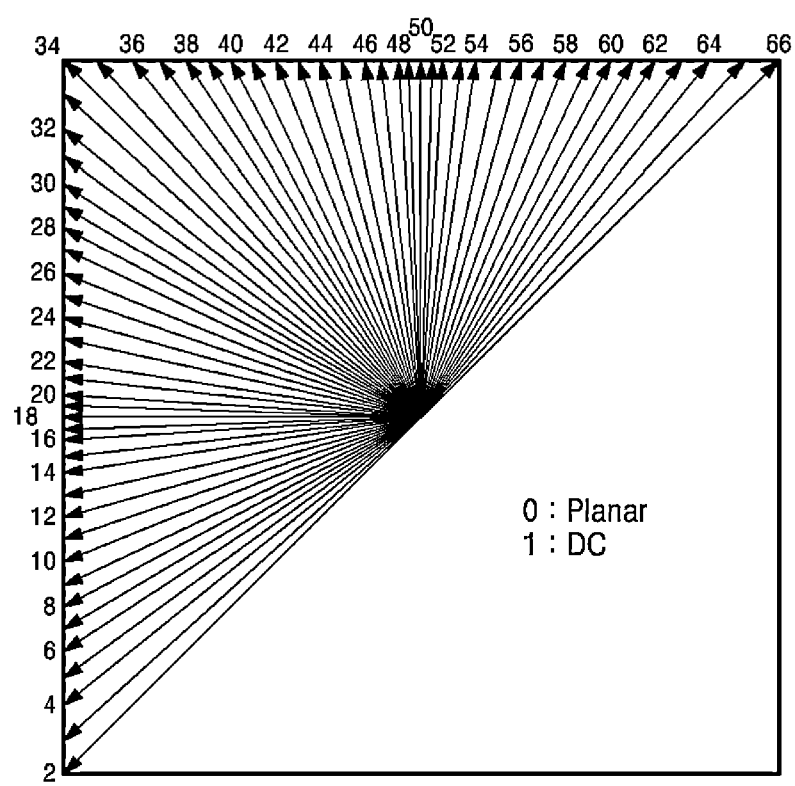
FIG. 3A illustrates a plurality of intra prediction modes.
Figure 3B:
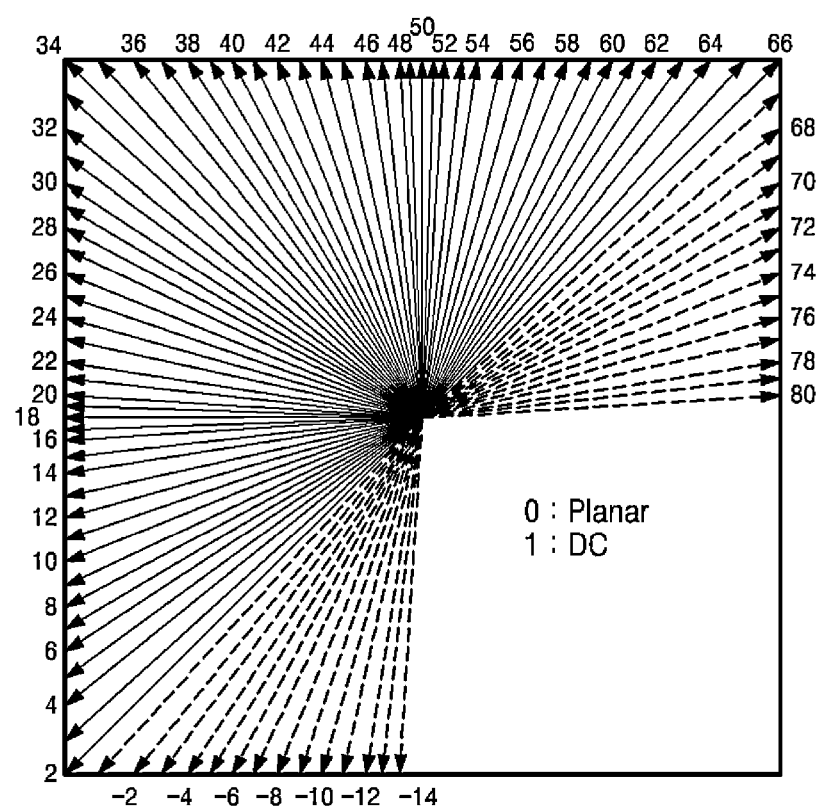
FIG. 3B illustrates a plurality of intra prediction modes including wide-angle intra prediction modes.

The intra-prediction unit 122 is configured to predict pixels in the current block using pixels (reference pixels) positioned around the current block in the current picture including the current block. There is a plurality of intra-prediction modes according to the prediction directions. For example, as shown in FIGS. 3A and 3B, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes". In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In particular, among the wide angle intra-prediction modes, some wide angle intra-prediction modes available for the current block may be determined based on a ratio of the width and height of the rectangular current block. For example, wide angle intra-prediction modes with an angle less than about 45 degrees (intra prediction modes 67 to 80) may be used when the current block has a rectangular shape with a height less than the width thereof. Wide angle intra-prediction modes with an angle greater than about −135 degrees (intra-prediction modes −1 to −14) may be used when the current block has a rectangular shape with height greater than the width thereof.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes and may be configured to select an intra-prediction mode that has the best rate distortion characteristics among the tested modes.

The intra-predictor 122 is configured to select one intra-prediction mode from among the plurality of intra-prediction modes and predict the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 is configured to generate a prediction block for the current block through motion compensation. The inter-predictor 124 is configured to search for a block most similar to the current block in a reference picture which has been encoded and decoded earlier than the current picture, and the inter-predictor 124 is also configured to generate a prediction block for the current block using the searched block. Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The predictor 120 may further use an intra block copy (IBC) mode. In the IBC mode, the predictor 120 is configured to search for a prediction block in the same frame or picture as the current block as in the intra prediction mode. However, the predictor 120 may usually search a wider search range including neighboring rows and columns of pixels. In the IBC mode, the predictor 120 may be configured to determine a block vector (referred to as a motion vector) to identify a prediction block in the same frame or picture as the current block. The block vector includes an x-component and a y-component, wherein the x-component identifies the horizontal displacement between the current block subjected to prediction and the prediction block, and the y-component identifies the vertical displacement between the current block subjected to prediction and the prediction block. The determined block vector is signaled in a bitstream such that the video decoding apparatus may identify the same prediction block as selected by the video encoding apparatus.

The subtractor 130 is configured to subtract the prediction block generated by the intra-predictor 122 or the inter-predictor 124 from the current block to generate a residual block.

The transformer 140 may be configured to split the residual block into one or more transform blocks and apply the transformation to the one or more transform blocks. Thus, the residual values of the transform blocks from the pixel domain to the frequency domain may be transformed. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block using the entire size of the residual block as a transformation unit. In addition, as described below with reference to FIG. 5, the transformer 140 may be configured to partition the residual block into two sub-blocks in a horizontal or vertical direction and transform only one of the two sub-blocks. Accordingly, the size of the transform block may be different from the size of the residual block (and thus the size of the prediction block). Non-zero residual sample values may not be present or may be very rare in the untransformed subblock. The residual samples of the untransformed subblock are not signaled and may be regarded as "0" by the video decoding apparatus. There may be multiple partition types according to the partitioning direction and partitioning ratio. The transformer 140 may provide information about the coding mode (or transform mode) of the residual block (e.g., information indicating whether the residual block is transformed or the residual subblock is transformed, information indicating the partition type selected to partition the residual block into subblocks, and information identifying a subblock that is transformed is performed) to the entropy encoder 155. The entropy encoder 155 may be configured to encode the information about the coding mode (or transform mode) of the residual block.

The quantizer 145 is configured to quantize transform coefficients output from the transformer 140 and output the quantized transform coefficients to the entropy encoder 155. For some blocks or frames, the quantizer 145 may be configured to directly quantize an associated residual block without transformation.

The rearrangement unit 150 may be configured to reorganize the coefficient values for the quantized residual value. The rearrangement unit 150 may be configured to change the 2-dimensional array of coefficients into a 1-dimensional coefficient sequence through coefficient scanning. For example, the rearrangement unit 150 may be configured to scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 is configured to encode the one-dimensional quantized transform coefficients output from the rearrangement unit 150 using uses various encoding techniques, such as Context-based Adaptive Binary Arithmetic Code (CABAC) and exponential Golomb, to generate a bitstream.

The entropy encoder 155 is configured to encode information, such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 is configured to encode information about a prediction type indicating whether the current block is encoded by intra-prediction or inter-prediction, and the entropy encoder 155 is also configured to encode intra-prediction information (i.e., information about an intra-prediction mode) or inter-prediction information (information about a reference picture index and a motion vector) according to the prediction type.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and configured to reconstruct the residual block.

The adder 170 is configured to add the reconstructed residual block to the prediction block generated by the predictor 120 to reconstruct the current block. The pixels in the reconstructed current block are used as reference pixels in performing intra-prediction of a next block.

The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 180 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
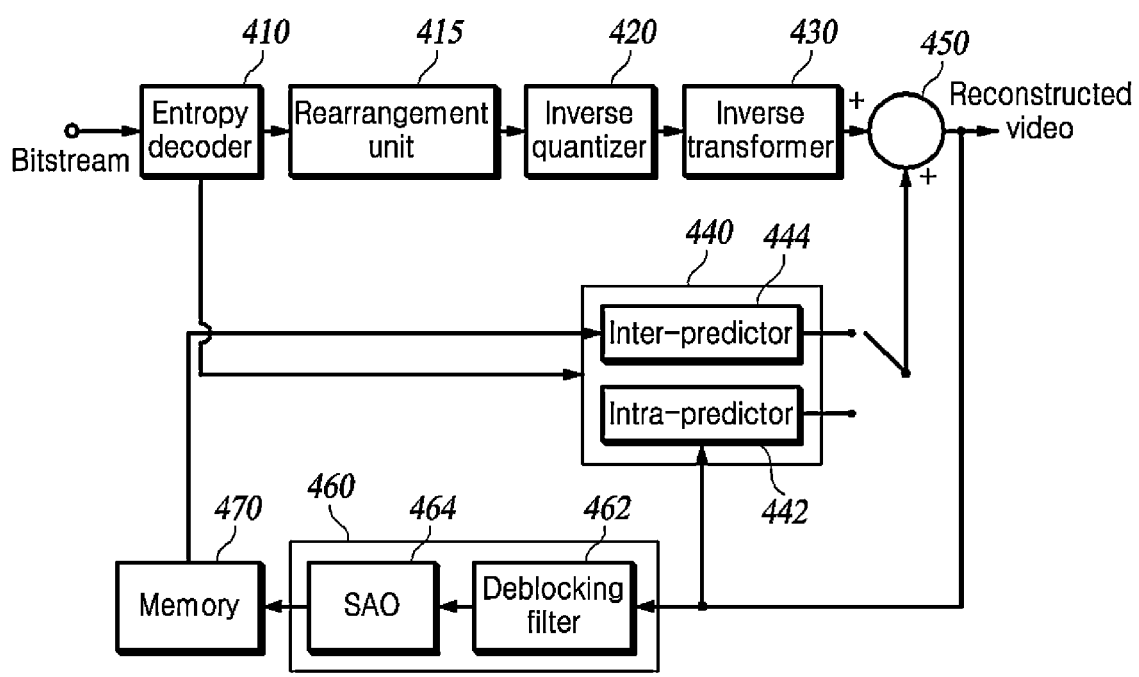
FIG. 4 is a block diagram of a video decoding apparatus that may implement the techniques of the present disclosure.

FIG. 4 is a functional block diagram of a video decoding apparatus capable of implementing the techniques of the present disclosure. Hereinafter, the video decoding apparatus and elements of the apparatus are described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 is configured to determine a current block to be decoded by decoding a bitstream generated by the video encoding apparatus and extract information related to block splitting. The entropy decoder 410 is also configured to extract prediction information and information about a residual signal or the like required to reconstruct the current block.

The entropy decoder 410 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, i.e., the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thus, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, i.e., information indicating a motion vector and a reference picture referred to by the motion vector.

The entropy decoder 410 is configured to extract information about the coding mode of the residual block (e.g., information about whether the residual block is encoded only a subblock of the residual block is encoded, information indicating the partition type selected to partition the residual block into subblocks, information identifying the encoded residual subblock, quantization parameters, etc.) from the bitstream. The entropy decoder 410 is also configured to extract information about quantized transform coefficients of the current block as information about the residual signal.

The rearrangement unit 415 may be configured to change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 is configured to inversely quantize the quantized transform coefficients. The inverse transformer 430 is configured to inversely transform the inversely quantized transform coefficients from the frequency domain to the spatial domain based on information about the coding mode of the residual block to reconstruct residual signals. Thus, a reconstructed residual block for the current block may be generated.

When the information about the coding mode of the residual block indicates that the residual block of the current block has been coded by the video encoding apparatus, the inverse transformer 430 uses the size of the current block (and thus the size of the residual block to be reconstructed) as a transform unit for the inverse quantized transform coefficients to perform inverse transform to generate a reconstructed residual block for the current block.

When the information about the coding mode of the residual block indicates that only one subblock of the residual block has been coded by the video encoding apparatus, the inverse transformer 430 uses the size of the transformed subblock as a transform unit for the inverse quantized transform coefficients to perform inverse transform to reconstruct the residual signals for the transformed subblock, and the inverse transformer 430 fills the residual signals for the untransformed subblock with a value of "0" to generate a reconstructed residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 is configured to determine an intra-prediction mode of the current block among a plurality of intra-prediction modes based on the syntax element for the intra-prediction mode extracted from the entropy decoder 410 and predict the current block using the reference pixels around the current block according to the intra-prediction mode.

The inter-predictor 444 is configured to determine a motion vector of the current block and a reference picture referred to by the motion vector using the syntax element for the intra-prediction mode extracted from the entropy decoder 410 and predict the current block based on the motion vector and the reference picture.

The predictor 440 may further use an intra block copy (IBC) mode. In the IBC mode, the predictor 440 is configured to search for a prediction block in the same frame or picture as the current block as in the intra prediction mode. However, the predictor 120 may usually search a wider search range including neighboring rows and columns of pixels. In the IBC mode, the predictor 440 may be configured to determine a block vector (referred to as a motion vector) to identify a prediction block in the same frame or picture as the current block. The predictor 440 may use the block vector decoded from a bitstream by the entropy decoder 410 to identify the same prediction block as selected by the video encoding apparatus.

The adder 450 is configured to reconstruct the current block by adding the residual block output from the inverse transformer and the prediction block output from the inter-predictor or the intra-predictor. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 is configured to perform additional filtering on the reconstructed block after deblocking filtering to corresponding offsets to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The present disclosure discloses a new coding tool that utilizes texture similarity within a video frame. Texture similarity within an image may be found in screen content video, where repetition of a simple shape or texture often occurs, and in various real-world pictures with repetitive textures or patterns (e.g., pictures with wallpaper in the background).

An intra prediction technique employs block prediction from neighboring blocks and does not consider long distance similarity between non-adjacent blocks. An intra block copy (IBC) is a technique that uses, as a prediction block, a block most similar to a block being encoded among previously reconstructed samples in a region within the same frame or slice unit. The IBC may improve prediction performance for pictures where texture repetition occurs frequently. To reduce memory consumption and decoder complexity, the IBC technology specified in the VVC standard searches for an IBC reference block within a predefined area called a virtual buffer, which may include only a current CTU area and a part of a left CTU. Therefore, the IBC may solve some of the weaknesses of the intra prediction technique that do not consider long distance similarity. However, the IBC is still restricted in utilizing long distance similarity due to the limited search range of the reference block. Similarly, in the inter prediction technique, the search range of the reference block is limited to reduce the encoder's complexity and avoid signaling a large motion vector.

In the following, a patch-book prediction mode and a new coding tool that can utilize the long distance similarity of textures within a video frame are presented.

In the patchbook prediction mode, a video encoder and a video decoder generate a prediction block for a coding block using a patchbook list. In the patchbook list, patchbooks, which are blocks having textures frequently appearing in a frame(s) of video data, are mapped to indices. After constructing the patchbook list, the encoder selects one or more patchbooks suitable for the coding block from the patchbook list and signals the index of each of the selected patchbooks. The decoder identifies a patchbook from the index parsed from a bitstream and predicts pixel values of the coding block using the color values defined within the identified patchbook.

Residual values may be signaled subsequently to the indices of the patchbook for pixels of a coding block predicted in the patchbook prediction mode. Accordingly, pixels of the coding block may be reconstructed by adding the residual values to the predicted values obtained using color values defined in the patchbook identified by an index. Alternatively, residual values may not be signaled for the pixels of a coding block predicted in the patchbook prediction mode. Thus, pixels of the coding block may be directly reconstructed from the values of a patchbook identified by an index of the patchbook. In some embodiments, signaling of residual values may be controlled using a 1-bit flag.

Figure 5:
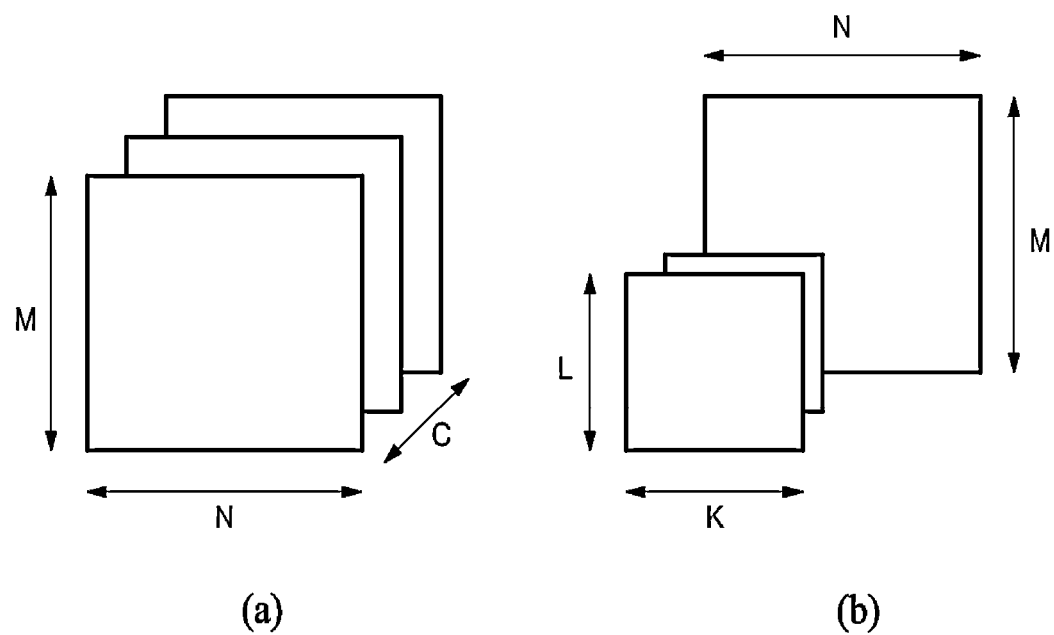
FIG. 5 is a conceptual diagram illustrating a patchbook list for coding video data according to one aspect of the present disclosure.

FIG. 5 is a conceptual diagram illustrating a patchbook list used in coding of video data according to one aspect of the present disclosure.

The patchbook list has a plurality of patchbooks matched to indices. Each element of a patchbook may have respective color component values of a given color space, such as <R, G, B>, <Y, Cb, Cr>, or <Y, Co, Cg>. Accordingly, one N×M size patchbook identified by one index value may include N×M elements having three color component values for each of the N×M pixels. Alternatively, a patchbook list may be used for each color component, or separate patchbook lists may be configured for luma and chroma components. Therefore, an index may be signaled for each color component or individually for luma and chroma components.

For example, in the case of a slice using a dual tree in which CU partitioning is different between luma and chroma components, a patchbook list for each color component (e.g., Y patchbook list, Cb patchbook list, and Cr patchbook list) may be used, or two patchbook lists may be used (e.g., Y patchbook list and Cb/Cr patchbook list). In the case of a single tree, one patchbook list including all color component (Y, Cb, and Cr) values in each patchbook may be used. In the case of a monochrome, one patchbook list may be used.

Patchbooks may have one predefined size (e.g., 4×4). The predefined size of a patchbook may be equal to or smaller than the size of the minimum CU allowed for a given picture. Alternatively, patchbooks of various sizes (e.g., 4×4, 8×8, or 16×16) may be used. Also, a patchbook may have a non-square shape (i.e., rectangular shape) where the width is different from the height. The largest patchbook may be equal to the size of the CTU, and the smallest patchbook may be equal to or smaller than the size of the smallest CU allowed for a given picture. Even a patchbook of size 1×1 may be also used to predict values in the pixel level. Accordingly, for a CU predicted in the patchbook prediction mode, one index indicating one patchbook or multiple indices indicating multiple patchbooks may be signaled. Thus, predicted values for each subset of samples within a CU may be determined based on color values defined in a different patchbook for each subset. Furthermore, the sizes of respective patchbooks for color components may be different according to the chroma subsampling format. For example, in the case of the 4:2:0 format, the size of patchbooks for chroma components may be half the size of a patchbook for a luma component. The sizes of patchbooks of luma and chroma components shown in (b) of FIG. 5 are N×M and L×K, respectively, where L=M/2 and K=N/2.

As part of coding a block in the patchbook prediction mode, the video encoder and decoder may first determine a list of patchbooks to be used for the block. The patchbook indices for the block may then be coded to indicate which entries in the patchbook list should be used to predict or reconstruct the pixels (samples) of the block. Also, data representing the number of indices determined for the block may be coded.

1. Predictive Encoding of Patchbook

To predict a patchbook list for a current block from a patchbook-based coded block, a patchbook prediction list (also referred to as a "patchbook predictor") may be introduced.

The patchbook prediction list may be updated for each block (e.g., CU or PU) or each group of blocks (e.g., a picture, a slice, or a CTU) of video data. A new patchbook prediction list for a subsequent block or a subsequent group of blocks may be generated based on updating a previous patchbook prediction list. For example, a video encoder and a video decoder may code a current block or group of blocks in the patchbook mode and then update a patchbook prediction list using the current patchbook list. The patchbook entries used in the current patchbook list are inserted into a new patchbook prediction list, and entries in the previous patchbook prediction list that are not used in the current patchbook list may be added at the next position of new entries of a new patchbook prediction list until the maximum allowed size of a patchbook prediction list is reached.

Initializing a patchbook prediction list refers to the process of generating a patchbook prediction list for the first block of a group of video blocks (e.g., a picture, a subpicture, a slice, or a tile). Since the patchbook prediction list used previously is unavailable for the first block, the patchbook prediction list for the first block may be initialized to zero. Accordingly, all entries of the patchbook list for the first block may be new entries explicitly signaled by the encoder.

Figure 6:
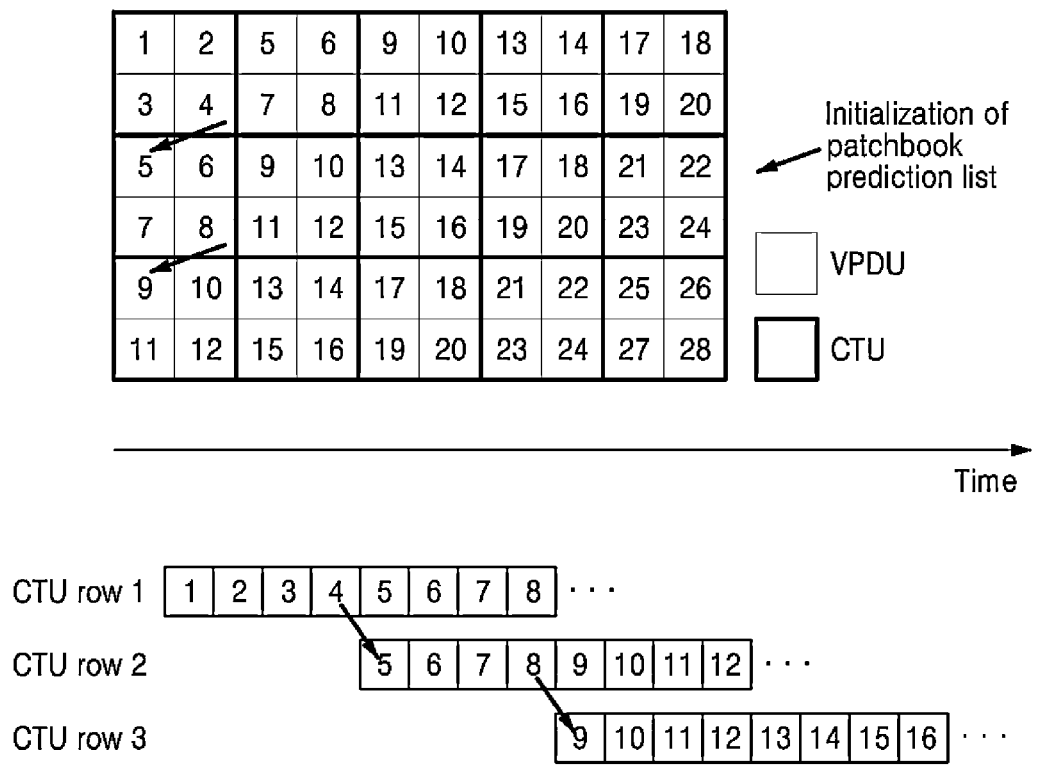
FIG. 6 is a conceptual diagram illustrating initialization of a patchbook prediction list when 1-coding tree unit (CTU) delay Wavefront Parallel Processing (WPP) is activated according to one aspect of the present disclosure.

Furthermore, when Wavefront Parallel Processing (WPP) is activated, a patchbook prediction list may have to be initialized in the first CTU (or VPDU) of each CTU row for parallel processing of CTU rows. At this time, instead of initializing the patchbook prediction list to 0, the patchbook prediction list for the first CTU (or VPDU) of the current CTU row may be initialized using the patchbook data of a previously decoded CTU or a VPDU located at the top of the current CTU row. In other words, the patchbook prediction list of a fully decoded CTU of the upper CTU row may be used directly as the patchbook prediction list of the first CTU of the current CTU row. For example, as shown in FIG. 6, when 1-CTU delay WPP (i.e., 4-VPDU delay WPP) is used, the patchbook prediction list to be used for constructing the patchbook list of the first CTU of the current CTU row may be initialized using the patchbook prediction list of the last VPDU having been decoded in the previous CTU row (i.e., using the patchbook prediction list of the upper CTU of the current CTU).

The entries of a patchbook list for the current block or group of blocks may be determined based on a patchbook prediction list. Specifically, to indicate which of the entries in the patchbook prediction list should be used in the current patchbook list, the video encoder may signal a binary flag (which may also be referred to as a "reuse flag") for each entry. A binary flag with a value of "1" may indicate that the related entry is used in the current patchbook list, and a binary flag with a value of "0" may indicate that the related entry is not used in the current patchbook list. A string of binary flags may be referred to as an index vector. The index vector may be transmitted in a bitstream using run-length coding (of bins of 0s or 1s).

The video decoder may parse the index vector from the bitstream and insert the patchbooks specified by the index vector among patchbooks within the patchbook prediction list (i.e., reused patchbooks) into the current patchbook list.

The patchbook list for coding a current block or group of blocks may also include one or more new patchbook entries which are explicitly coded or implicitly determined (e.g., apart from the index vector). One or more new patchbooks may be added to the current patchbook list after the reused patchbooks.

Figure 7:
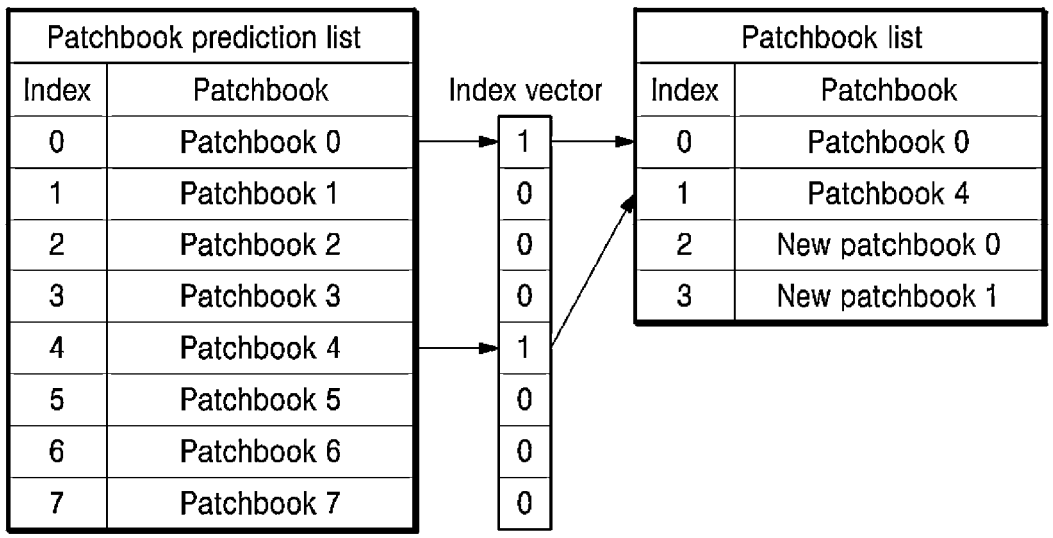
FIG. 7 is a conceptual diagram illustrating an example of constructing a patchbook list for coding block(s) of video data according to one aspect of the present disclosure.

FIG. 7 is a conceptual diagram illustrating an example of constructing a patchbook list for coding a block(s) of video data according to an aspect of the present disclosure. In the example of FIG. 7, a patchbook prediction list has 8 entries. The index vector indicates that the first and fifth entries of the patchbook prediction list (i.e., entries having index 0 and index 4) are included in the current patchbook list, and the remaining entries (i.e., indices 1 to 3 and indices 5 to 6) are not included in the current patchbook list.

The number of reused entries may be signaled separately from the index vector at the patchbook prediction list. Also, the size of the current patchbook list (i.e., the maximum number of entries) or the number of new patchbooks to be used in the current patchbook list may be signaled. In some embodiments, a flag indicating the presence or absence of new patchbooks may be coded.

In the patchbook list illustrated in FIG. 7, the patchbooks corresponding to indices 2 and 3 are not the entries on the patchbook prediction list but are new entries explicitly signaled by the encoder or implicitly determined by the decoder. When all entries of the patchbook list are filled by the index vector, coding of syntax elements indicating a new patchbook entry may be skipped.

Alternatively, entries of a patchbook list for patchbook-based coding of a block may be determined based on a default patchbook list signaled at a high level. For example, the video encoder may signal a default patchbook list having a plurality of patchbooks at a high level (e.g., Picture Parameter Set (PPS), Sequence Parameter Set (SPS), Adaptation Parameter Set (APS), or slice header). The video encoder, like the method illustrated in FIG. 7 that employs an index vector, may indicate patchbooks to construct a patchbook list for a block or a group of blocks belonging to the high level among patchbooks within the default patchbook list. The video decoder may decode syntax elements at the high level to determine the default patchbook list and, like the method illustrated in FIG. 7, construct a patchbook list for patchbook-based predictive decoding of a block or group of blocks belonging to the high level.

2. Generation and Signaling of New Patchbook

As described above, one or more new patchbooks, which are generated and signaled by a video encoder, may be added to the patchbook list or the patchbook prediction list. Hereinafter, several schemes for efficiently generating and signaling a new patchbook are described.

For now, suppose the video encoder signals a new patchbook of size N×M. In the first scheme, the video encoder may signal one representative value for entries (i.e., samples) within the new patchbook and may additionally signal difference values between each sample and the representative value. The representative value may be an average value or a median value of samples within the new patchbook or may be a value of a sample at a specific position (e.g., [0][0] position) in the patchbook. When the patchbook are individually defined for each color component, a representative value may be individually defined for each color component, and a patchbook having a size of N×M for each color component may be derived as follows.

$$LumaBook[i][j]=LumaRval+LumaRes[i][j]$$

$$CbBook[i][j]=CbRval+CbRes[i][j]$$

$$CrBook[i][j]=CrRval+CrRes[i][j] \quad\quad [Eq.~1]$$

In Eq. 1, LumaRval, CbRval, and CrRval correspond to the representative values of Y, Cb, and Cr color components, respectively; LumaRes, CbRes, and CrRes correspond to the difference values of Y, Cb, and Cr color components, respectively. In the case of the YCbCr 4:4:4 format, $0 \le i < N$, $0 \le j < M$. In the case of the YCbCr 4:2:0 format or YCbCr 4:2:2 format, $0 \le i < N/2$, $0 \le j < M/2$ for CbBool and CrBook.

If each entry of the new patchbook defines the values of all color components (i.e., in the case of a 3-channel patchbook defining 3-channel pixel values for each sample position), the representative values may be the 3-channel values, and a patchbook of N×M size may be derived as follows.

$$Book[i][j]=Rval+Resi[i][j], \quad 0 \le i < N,~0 \le j < M \quad\quad [Eq.~2]$$

In Eq. 2, Rval is the representative values of 3 channels, and Resi is the difference values of the 3 channels.

Also, the video encoder may encode the difference values between each sample and the representative value in a manner similar to that commonly performed for a residual block of a video block. In other words, the video encoder may perform entropy encoding as well as transform and/or quantization processes on the difference values. Accordingly, the video decoder may perform entropy decoding, inverse transform, and/or inverse quantization process to obtain difference values LumaRes, CbRes, CrRes, or Resi from a bitstream.

In the second scheme, the video encoder may signal one representative value for the samples of a new patchbook and signal an index indicating the size of the new patchbook. The video decoder may check the size of the patchbook indicated by the index by referring to a predefined mapping table and generate a new patchbook having the size indicated by the index, where the pixel value at all sample positions within the new patchbook has one representative value (i.e., the same value). Table 1 illustrates a mapping table that maps patchbook sizes to indices.

TABLE 1

| Index | Patchbook size |
|---|---|
| 0 | $(N_0 \times M_0)$ |
| 1 | $(N_0 \times M_0)$ |
| ... | ... |
| k − 1 | $(N_{k-1} \times M_{k-1})$ |

In the third scheme, the video encoder may generate a new patchbook by combining some patchbooks having a smaller size than the new patchbook and existing in the current patchbook prediction list. For example, the video encoder may generate a new 16×16 patchbook by merging or stitching four patchbooks of 4×4 size. The video encoder may signal patchbook indices on the current patchbook prediction list to indicate patchbooks used to generate a new patchbook. The decoder may generate a new patchbook by parsing patchbook indices from the bitstream and merging or stitching current patchbooks mapped to the patchbook indices.

In the fourth scheme, the video encoder may generate a new patchbook from a reconstructed region in the current frame or a previously encoded and decoded frame. For example, the video encoder and video decoder may add a reconstructed block of an intra prediction coded block or a reconstructed block of an inter prediction coded block as a new patchbook to a patchbook prediction list. Whether to add a reconstructed block to the patchbook prediction list may be controlled by the video encoder using a 1-bit flag. Also, the video encoder may generate a new patchbook from a reconstructed block of a block coded in the IBC mode. In this case, whether to add the reconstructed block to the patchbook prediction list may be implicitly determined depending on the block vector used in the IBC mode. For example, when the block vector is greater than or equal to a preset threshold, a related reconstructed block may be added to the patchbook prediction list as a new patchbook.

Similarly, whether to add a reconstructed block of an inter prediction coded block to the patchbook prediction list may be implicitly determined depending on a motion vector used for inter prediction. For example, when a motion vector is greater than or equal to a preset threshold, a related reconstructed block may be added to a patchbook prediction list as a new patchbook. As another example, for a reconstructed block of an inter prediction coded block having a motion vector greater than or equal to a preset threshold, the encoder may control whether to add the reconstructed block to the patchbook prediction list by using a 1-bit flag.

Figure 8:
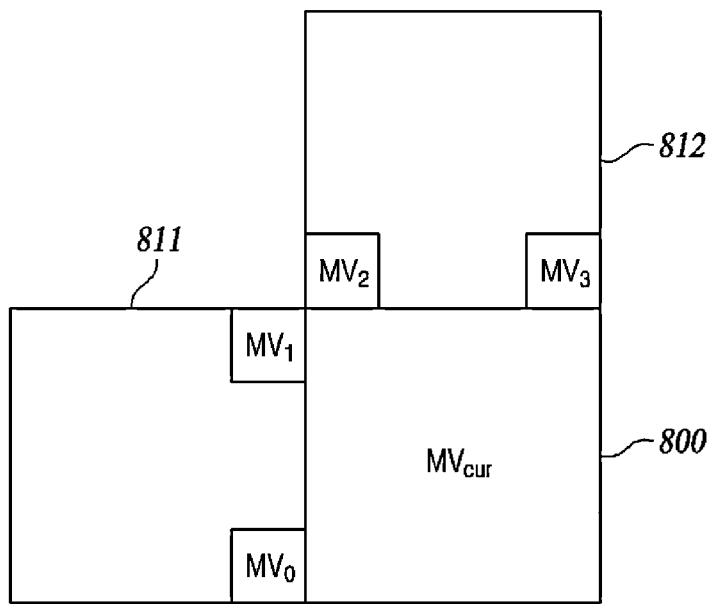
FIG. 8 illustrates a current block coded in intra prediction and motion vectors of neighboring blocks.

A reconstructed block having a considerably different motion from neighboring blocks may be used as a new patchbook. For example, referring to FIG. 8, when a difference between a motion vector $MV_{cur}$ of the current block 800 and at least one of motion vectors $MV_0, MV_1, MV_2$, and $MV_3$ of neighboring blocks 811, 812 is greater than or equal to a preset threshold, the reconstructed block of the current block 800 may be added to the patchbook prediction list as a new patchbook. Accordingly, the video encoder and the video decoder determine whether to add the reconstructed block of the current block 800 to the patchbook prediction list as a new patchbook based on the comparison between the motion vectors $MV_0$, $MV_1$, $MV_2$, and $MV_3$ of the neighboring blocks 811, 812 and the motion vector $MV_{cur}$ of the current block 800.

A new patchbook may be generated from a part of a reconstructed block of an intra prediction coded block, an inter prediction coded block, or a block coded in the IBC mode.

For example, the video encoder and decoder may generate a new patchbook of size N×M from a predefined N×M region, which is part of a reconstructed block. Therefore, the size of the new patchbook may be smaller than that of the reconstructed block. The predefined N×M region may be defined based on the upper left, the upper right, the lower left, the lower right, or center position within the reconstruction block.

Figures 9, 10:
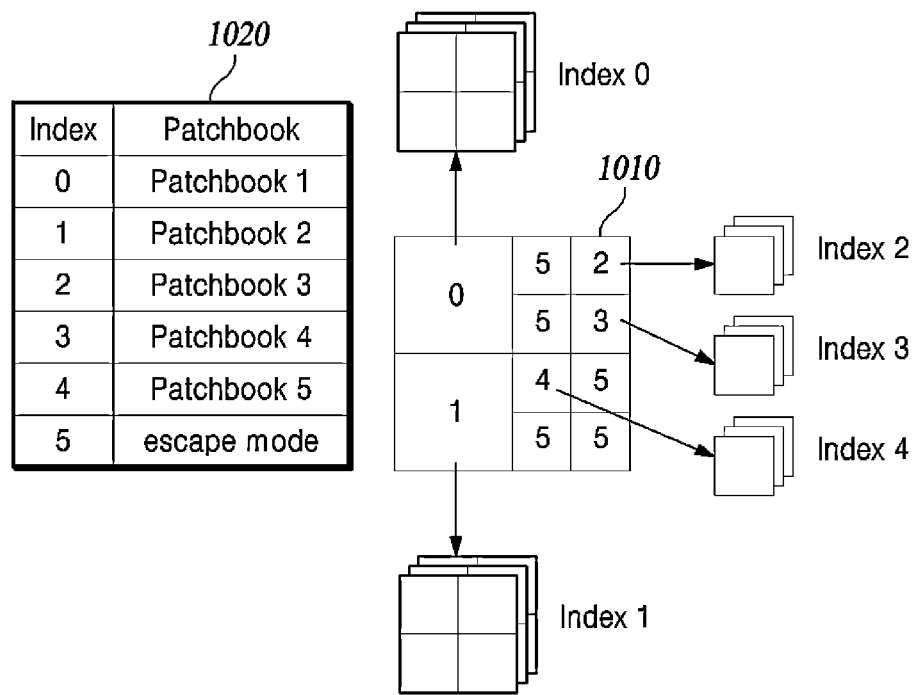
FIG. 9 illustrates a residual block related to an 8×4 reconstruction block.
FIG. 10 illustrates an example in which an index of a patchbook list is assigned to each subset of a block of video data, according to one aspect of the present disclosure.

As another example, the video encoder and the video decoder may generate a new patchbook from an N×M region in which the sum of absolute values of residual values is the smallest among possible N×M regions in the reconstructed block. FIG. 9 illustrates a residual block 900 related to a reconstructed block of size 8×4. When a 4×4 patchbook is generated from an 8×4 reconstruction block, five different 4×4 regions (i.e., five candidate regions) may be considered as the possible regions in the reconstructed block (and in its corresponding residual block 900). In the residual block 900 illustrated in FIG. 9, a 4×4 region indicated by a thick box is an area in which the sum of absolute values of residual values is the smallest among possible 4×4 regions within the residual block. In other words, the video encoder and the video decoder may determine the region of the reconstructed block corresponding to the 4×4 region 910 as a new patchbook. The video encoder and the video decoder may not generate a new patchbook from the reconstructed block when the sum of the smallest absolute values is greater than a preset threshold.

3. Escape Mode

Some subset(s) of samples in a coding block may not be identical or similar to the texture of any patchbook included in a patchbook list. Such subset of samples may not be suitable to be coded in the patchbook-based prediction mode. Thus, it may be efficient to allow some subsets of samples to be coded in a different mode for a coding block coded in the patchbook-based prediction mode. The different mode may be referred to as "escape mode," and samples (subset) coded in the escape mode may be referred to as "escape samples (or escape subset)."

The video encoder and the video decoder may be configured to code and/or determine a flag (which may be referred to as a block-level escape flag) indicating whether some samples of a block are coded in the escape mode. For example, a flag value of 0 may indicate that no samples in the block are coded using the escape mode. In other words, values of all samples of a block may be determined based on a patchbook included in the patchbook list for coding a block. A flag value of 1 may indicate that some samples in the block are coded using the escape mode. In other words, values of some samples of a block are coded as escape samples.

The presence of escape samples in a block may affect the number of indices in the patchbook list for the block. For example, a patchbook list, of the block, generated from the patchbook prediction list may have N indices such that the index for a subset of samples may be selected from among {0, 1, ..., N−1}. Suppose the block-level escape flag indicates the existence of escape pixels in the current block. In that case, the video encoder and the video decoder may add one new index (not related to a patchbook) to the patchbook list for the current block so that index values available for the current block are {0, 1, ..., N−1, N}. Here, the new index equal to N (also referred to as the escape index) indicates that the subset of related samples is composed of escape samples. Each of the indices less than N may indicate that the related subset of samples is predicted or expressed by color values (i.e., texture) from the patchbook related to that index.

Therefore, to indicate that a specific subset of samples of the block is coded in the escape mode, the encoder may encode data representing the last index of the patchbook list (i.e., the escape index), the index of which has been increased by "1." A video decoder may infer that if the index for a specific subset of the block is equal to the escape index, the specific subset is decoded in the escape mode.

FIG. 10 illustrates a case in which an index of a patchbook list 1020 is assigned to each subset of a block 1010 of video data. The illustrated patchbook list 1020 has five indices related to the respective patchbooks, and the last index indicates the escape mode. The illustrated block 1010 includes five subsets to which the escape index is assigned.

4. Coding of Escape Samples

For escape samples whose sample values are not included as a patchbook entry in the patchbook list, the video encoder may explicitly signal quantized sample values in the bitstream for all color components.

Alternatively, a set of escape samples in a coding block may be predicted from previously decoded neighboring samples in the non-directional mode (i.e., DC, Planar) or directional mode, similar to intra prediction samples. Therefore, for a set of escape samples, the residual values obtained by subtracting intra predicted values from the original sample values may be quantized and then signaled in the bitstream by the video encoder. The video encoder may signal a syntax element indicating the intra prediction mode selected for the set of escape samples. The video encoder and the video decoder may be configured always to use one intra prediction mode preset for the escape samples. In this case, signaling a syntax element indicating the mode number of the intra prediction mode is not required.

For a set of escape samples, the video encoder calculates the RD-cost for 1) explicitly signaling quantized sample values and 2) predicting the quantized sample values from surrounding samples. The video encoder also determines, based on the RD-cost, whether to explicitly signal the quantized sample values. The video encoder may also signal in the bitstream a 1-bit flag indicating whether quantized sample values are explicitly signaled for the set of escape samples. The video decoder may parse the 1-bit flag to determine whether to decode quantized sample values from the bitstream for a set of escape samples or predict the sample values of escape samples from a previously decoded neighboring block.

5. Scanning Order of Patchbook Index

Allocation information of patchbook indices for subsets of pixels in a CU may be referred to as a patchbook index map. A video encoder may derive a one-dimensional array of patchbook indices by scanning the patchbook indices in the patchbook index map according to a scanning order. Similarly, the video decoder may use the scanning order to recover the allocation information of the patchbook indices for subsets of pixels in the CU.

Figure 11:
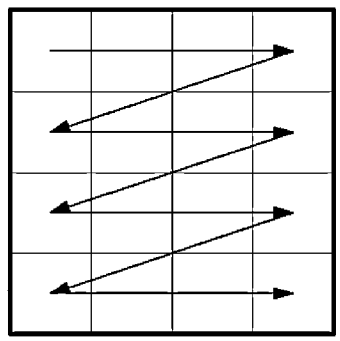
FIG. 11 illustrates scanning orders for coding a patchbook index map when all patchbooks have the same size.
Figure 11:
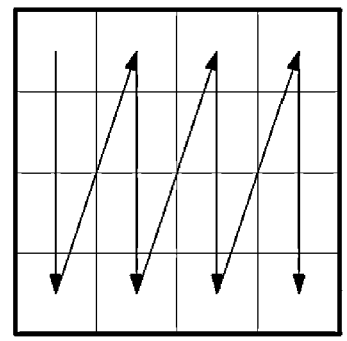

When the sizes of patchbooks available in the patchbook mode are all the same, to scan the patchbook indices of a given CU, the horizontal traverse scanning sequence shown in (a) of FIG. 11 and the vertical traverse scanning order shown in (b) of FIG. 11 may be used selectively. In another embodiment, the scanning order may selectively use the horizontal scanning order and the vertical scanning order. The video encoder may signal a flag indicating the scanning order used for a given CU.

Figure 12:
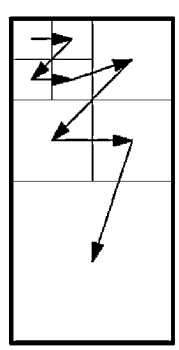
FIG. 12 illustrates scanning orders for coding a patchbook index map when patchbooks of various sizes are available.
Figure 12:
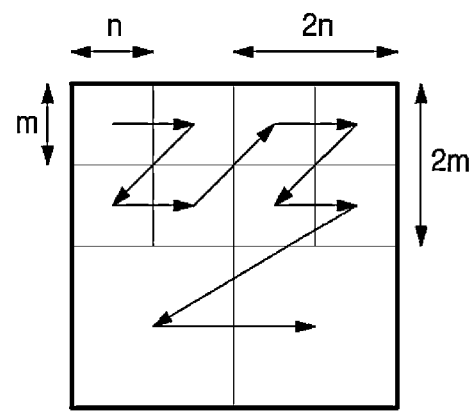

When patchbooks of various sizes are available in the patchbook mode, the Z-scan scanning order illustrated in FIG. 12 may be used to scan patchbook indices of a given CU. The patchbooks used for coding the CU illustrated in (a) of FIG. 12 have three different sizes, and the patchbooks used for coding the CU illustrated in (b) of FIG. 12 have two different sizes. As shown in FIG. 12, when the size of the smallest patchbook is n×m, Z-scanning may be performed in units of 2n×2m. The size of the smallest patchbook may have the size of the smallest patchbook in the patchbook list determined for the CU or a size predefined for the video encoder and the video decoder.

Hereinafter, with reference to FIGS. 13 and 14, encoding and decoding methods using the patchbook-based coding technique are described. For example, the video encoding apparatus and the video decoding apparatus illustrated respectively in FIG. 1 and FIG. 4 may perform the illustrated encoding and decoding methods, respectively.

Figure 13:
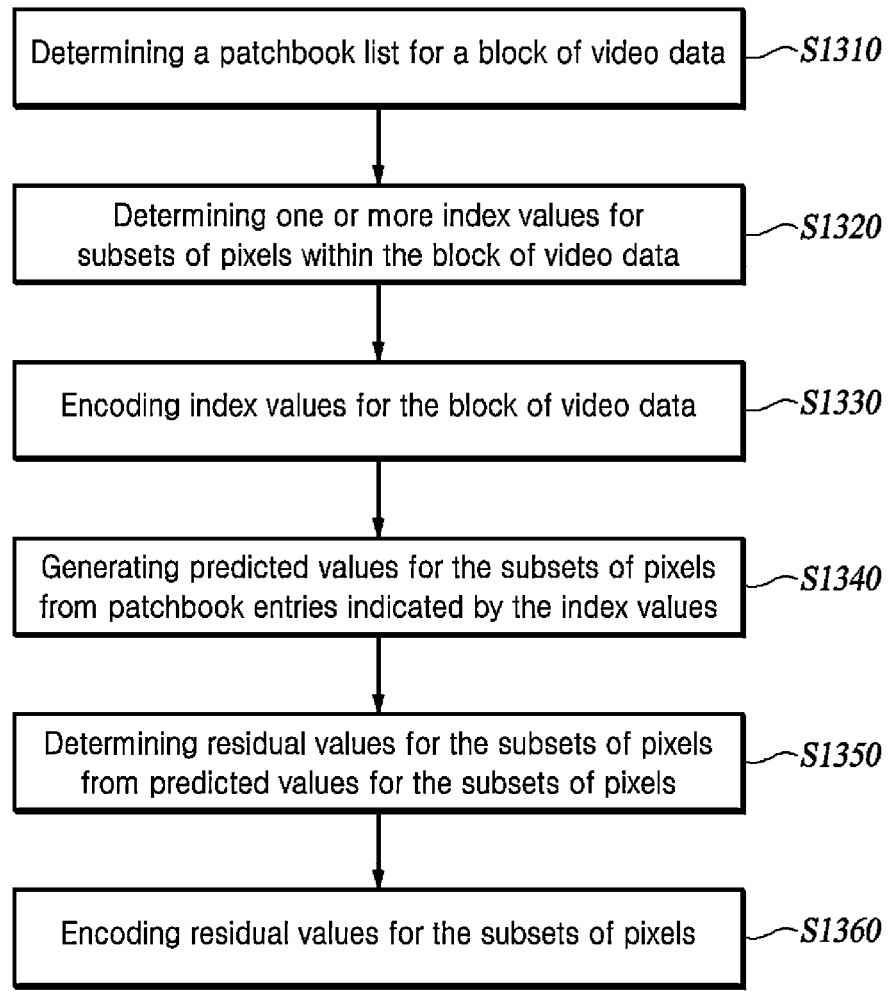
FIG. 13 is a flow diagram illustrating a method for encoding video data using a patchbook-based coding technique according to one aspect of the present disclosure.

FIG. 13 is a flow diagram illustrating a method for encoding video data using a patchbook-based coding technique according to one aspect of the present disclosure.

As part of encoding a block of video data in the patchbook prediction mode, the video encoder may determine a patchbook list to be used for the block of video data (S1310).

The video encoder may determine one or more index values in the patchbook list for the block of video data (S1320). Each index value represents a patchbook entry having color values corresponding to a subset of pixels in the block among the patchbook entries of the patchbook list.

Next, the video encoder may encode the patchbook indices for a block of video data to indicate which entries of the patchbook list should be used to predict or reconstruct the pixels (samples) of the block (S1330).

The video encoder may determine a patchbook prediction list that includes one or more candidate patchbooks. The video encoder may determine at least one entry used in the patchbook list for the block of video data among the entries of the patchbook prediction list. The video encoder may signal a binary flag for each entry to indicate which of the entries in the patchbook prediction list should be used in the current patchbook list. Entries of the patchbook list used for another previously reconstructed block of video data may be included in the patchbook prediction list. Also, among the previously encoded blocks of the video data, new entries from (1) a reconstructed block of an intra prediction coded block, (2) a reconstructed block of an inter prediction coded block, or (3) a reconstructed block of a block encoded in the IBC mode may be included in the patchbook prediction list. Also, the patchbook prediction list may include a new entry generated by stitching entries existing in a patchbook prediction list determined for another previously encoded block of video data.

The video encoder may generate predicted values for subsets of pixels of the block from patchbook entries indicated by the index values (S1340). Also, the video encoder may determine residual values of the subsets of pixels of the block from predicted values of the subsets of pixels of the block (S1350). Also, the video encoder may encode residual values for subsets of pixels of the block (S1360).

The video encoder may determine whether the block of video data contains a subset of escape pixels related to none of the entries of the patchbook list. The video encoder may perform an encoding process including transform and quantization on a subset of escape pixels to encode sample values for the escape pixels into a bitstream. Alternatively, the video encoder may generate predicted values for the subset of escape pixels from a reconstructed block adjacent to the block of video data. Also, the video encoder may generate residual values for the subset of escape pixels based on the predicted values and encode the residual values into the bitstream.

Figure 14:
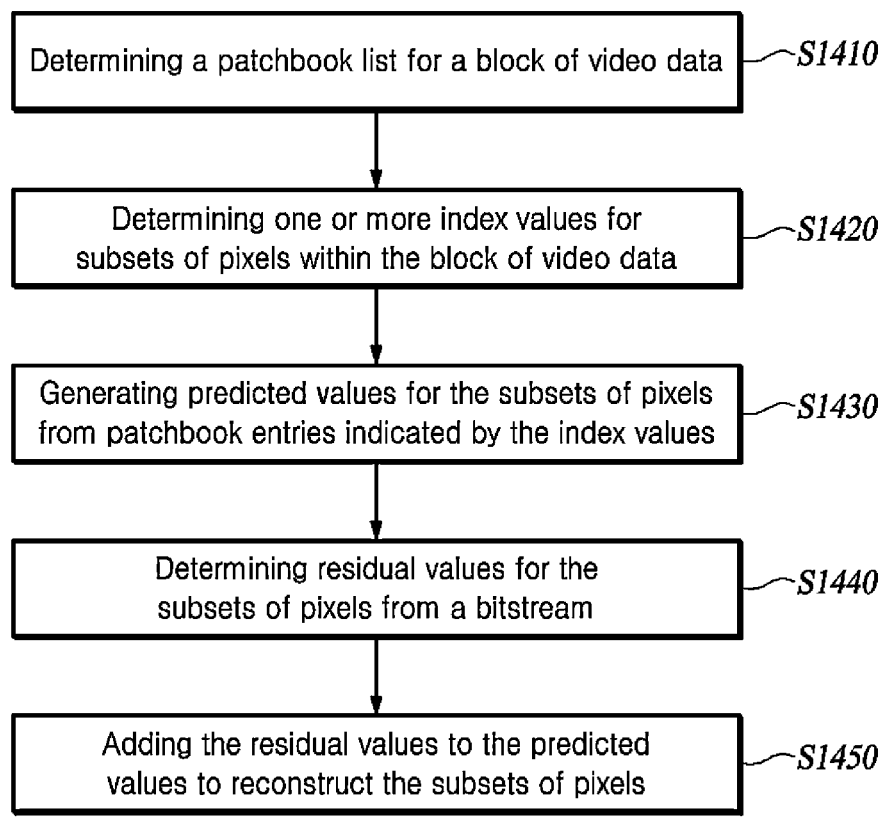
FIG. 14 is a flow diagram illustrating a method for decoding video data using a patchbook-based coding technique according to one aspect of the present disclosure.

FIG. 14 is a flow diagram illustrating a method for decoding video data using a patchbook-based coding technique according to one aspect of the present disclosure.

As part of decoding a block of video data in the patchbook prediction mode, the video decoder may determine a patchbook list to be used for the block of video data (S1410). To determine the patchbook list, the video decoder may determine a patchbook prediction list that includes one or more candidate patchbooks and determine at least one entry used in the patchbook list for the block among the entries of the patchbook prediction list. Alternatively, the patchbook list to be used for the block of video data may be determined based on a default patchbook list specified by high-level syntax elements. The video decoder may determine at least one entry used in the patchbook list for the block of video data among the entries of the default patchbook list.

The video decoder may determine one or more index values in the patchbook list for the block of video data from the bitstream (S1420). Each index value indicates a patchbook entry having color values corresponding to a subset of pixels in the block among patchbook entries in the patchbook list. In other words, the index values indicate which entries of the patchbook list should be used to predict or reconstruct the pixels (samples) of the block.

Next, the video decoder may reconstruct subsets of the pixels based on the patchbook list for the block of video data and the index values. The video decoder may generate predicted values for the subsets of pixels from the patchbook entries indicated by the index values (S1430), determine residual values for the subsets of pixels from the bitstream (S1440), and add the residual values to the predicted values (S1450). Alternatively, the video decoder may generate reconstructed sample values for subsets of pixels from patchbook entries indicated by index values without determining residual values for subsets of pixels of the block from the bitstream.

The video decoder may determine whether a block of video data contains a subset of escape pixels related to none of the entries of the patchbook list. A video decoder may obtain encoded sample values for the subset of escape pixels from a bitstream and perform inverse transform and inverse quantization on the encoded sample values to reconstruct the subset of escape pixels. Alternatively, the video decoder may generate prediction data for a subset of escape pixels from a reconstructed block adjacent to the block of video data. Also, the video decoder may obtain residual data for a subset of escape pixels from the bitstream and add the residual data to the prediction data to reconstruct the subset of escape pixels.

It should be understood that the embodiments described above may be implemented in many different ways. The functions or methods described in one or more examples may be implemented in hardware, software, firmware, or any combination thereof. It should be understood that the functional components described herein have been labeled "unit" to further emphasize their implementation independence.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although embodiments of the present disclosure have been described for illustrative purposes, those having ordinary skill in the art should appreciate that and various modifications and changes are possible, without departing from the idea and scope of the disclosure. Embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method for decoding video data, the method comprising:

determining a patchbook list for a block of video data, wherein the patchbook list includes patchbook entries and maps index values to patchbook entries, wherein at least one of the patchbook entries contains N×M elements defining colors for N×M pixels, and each of N×M elements has three color component values for an individual pixel, where either N or M is an integer greater than or equal to 2;

decoding one or more index values for the block of video data, wherein each of the decoded one or more index values indicates a corresponding patchbook entry to be used in predicting a subset in the block of video data among the patchbook entries of the patchbook list, wherein the subset is an array of a plurality of spatially adjacent pixels and within the block of video data, and a size of the array of the subset is the same as a size of the corresponding patchbook entry; and reconstructing subsets subset-wisely based on the patchbook list for the block of video data and the decoded one or more index values, wherein reconstructing the subsets includes:

generating predicted values for the subsets subset-wisely from patchbook entries indicated by the decoded one or more index values.

2. The method of claim 1, wherein reconstructing subsets of pixels includes:

determining residual values for the subsets from a bitstream; and adding the residual values to the predicted values.

3. The method of claim 1, wherein reconstructing subsets includes generating reconstructed sample values for the subsets from patchbook entries indicated by the index values without determining residual values for the subsets from a bitstream.

4. The method of claim 1, further including:

determining whether the block contains a subset having escape pixels related to none of the patchbook entries of the patchbook list;

obtaining encoded sample values for the subset having escape pixels from a bitstream; and performing inverse-transform and inverse quantization on the encoded sample values to reconstruct the subset having escape pixels.

5. The method of claim 1, further including:

determining whether the block contains a subset having escape pixels related to none of the patchbook entries of the patchbook list;

generating predicted values for the subset having escape pixels from a reconstructed block adjacent to the block;

obtaining residual values for the subset having escape pixels from a bitstream; and inverse quantization adding the residual values to the predicted values to reconstruct the subset having escape pixels.

6. The method of claim 1, wherein determining a patchbook list for a block of video data includes:

determining a patchbook prediction list including one or more candidate patchbooks; and determining at least one entry used in a patchbook list for the block of video data among entries of the patchbook prediction list.

7. The method of claim 6, wherein determining a patchbook prediction list includes determining entries of a patchbook list used for another previously reconstructed block of the video data as an entry of the patchbook prediction list.

8. The method of claim 6, wherein determining a patchbook prediction list includes, among previously reconstructed blocks of the video data, generating a new entry of the patchbook prediction list from (1) a reconstruction block of a block encoded in an intra prediction, (2) a reconstruction block of a block encoded in an inter prediction, or (3) a reconstruction block of a block encoded in an intra block copy (IBC) mode.

9. The method of claim 1, wherein determining a patchbook prediction list includes generating a new entry of the patchbook prediction list by stitching entries existing in a patchbook prediction list determined for another previously reconstructed block of the video data.

10. The method of claim 1, wherein determining a patchbook list for a block of video data includes:

identifying a default patchbook list specified by high level syntax elements signaled in a bitstream; and determining at least one entry used for the patchbook list for the block of video data among entries of the default patchbook list.

11. A method for encoding video data, the method comprising:

determining a patchbook list for a block of video data, wherein the patchbook list includes patchbook entries and maps index values to patchbook entries, and wherein at least one of the patchbook entries contains N×M elements defining colors for N×M pixels, and each of N×M elements has three color component values for an individual pixel, where either N or M is an integer greater than or equal to 2;

determining one or more index values for the block of video data, wherein each of the determined one or more index values indicates a corresponding patchbook entry to be used in predicting a subset in the block of video data among the patchbook entries of the patchbook list, wherein the subset is an array of a plurality of spatially adjacent pixels within the block of video data, and a size of the array of the subset is the same as a size of the corresponding patchbook entry;

encoding the determined one or more index values for the block of video data; and generating predicted values for subsets subset-wisely from patchbook entries indicated by the determined one or more index values.

12. The method of claim 11, further including:

determining residual values for the subsets from predicted values for the subsets; and encoding the residual values for the subsets.

13. The method of claim 11, further including:

determining whether the block of video data contains a subset having escape pixels related to none of the patchbook entries of the patchbook list; and performing an encoding process including inverse-transform and inverse quantization on sample values of the subset having escape pixels.

14. The method of claim 11, further including:

determining whether the block of video data contains a subset having escape pixels related to none of the patchbook entries of the patchbook list;

generating predicted values for the subset having escape pixels from a reconstructed block adjacent to the block of video data;

generating residual values for the subset having escape pixels based on the predicted values for the subset having escape pixels; and encoding the residual values for the subset having escape pixels.

15. The method of claim 11, further including:

determining a patchbook prediction list including one or more candidate patchbooks; and encoding a sequence of binary flags indicating at least one entry used in the patchbook list for the block of video data among entries of the patchbook prediction list.

16. The method of claim 15, wherein determining a patchbook prediction list includes determining entries of the patchbook list used for another previously reconstructed block of the video data as an entry of the patchbook prediction list.

17. The method of claim 15, wherein determining a patchbook prediction list includes, among previously encoded blocks of the video data, generating a new entry from (1) a reconstructed block of a block encoded in an intra prediction, (2) a reconstructed block of a block encoded in an inter prediction, or (3) a reconstructed block of a block encoded in an intra block copy (IBC) mode.

18. The method of claim 11, wherein determining a patchbook prediction list includes generating a new entry by stitching entries existing in a patchbook prediction list determined for another previously reconstructed block of the video data.

19. The method of claim 11, wherein determining a patchbook list for a block of video data includes:

identifying a default patchbook list specified by high level syntax elements signaled in a bitstream; and determining at least one entry used for the patchbook list for the block of video data among entries of the default patchbook list.

20. A method for providing video data to a video decoding device, the method comprising:

encoding the video data into a bitstream; and transmitting the bitstream to the video decoding device, wherein encoding the video data comprises:

determining a patchbook list for a block of the video data, wherein the patchbook list includes patchbook entries and maps index values to patchbook entries, and wherein at least one of the patchbook entries contains N×M elements defining colors for N×M pixels, and each of N×M elements has three color component values for an individual pixel, where either N or M is an integer greater than or equal to 2;

determining one or more index values for the block of video data, wherein each of the determined one or more index values indicates a corresponding patchbook entry to be used in predicting a subset in the block of video data among the patchbook entries of the patchbook list, wherein the subset is an array of a plurality of spatially adjacent pixels within in the block of video data, and a size of the array of the subset is the same as a size of the corresponding patchbook entry;

encoding the determined one or more index values for the block of video data; and generating predicted values for subsets subset-wisely from patchbook entries indicated by the determined one or more index values.

* * * * *